United States Patent [19]
Gagnon et al.

[11] 3,889,854
[45] June 17, 1975

[54] MEASURING AND DISPENSING DEVICE

[76] Inventors: Rudolph A. Gagnon; Ann K. Matt, both of 2 Aster Terr., Key West, Fla. 33040

[22] Filed: Feb. 19, 1974

[21] Appl. No.: 443,737

[52] U.S. Cl. .............................................. 222/284
[51] Int. Cl. .......................................... G01f 11/18
[58] Field of Search .......... 222/366, 438, 440, 362, 222/551, 564, 284, 357, 363, 404

[56] References Cited
UNITED STATES PATENTS
2,063,605  12/1936  Janssens.......................... 222/366 X
2,087,929  7/1937   Stargardt ........................ 222/366 X

*Primary Examiner*—Stanley H. Tollberg
*Assistant Examiner*—Norman L. Stack, Jr.

[57] ABSTRACT

A measuring and dispensing device comprising a cylindrical body with a hinged capped top portion and a generally open bottom portion and a plurality of intermediate spaced-apart baffles. The first baffle adjacent the cap has at least one opening or pouring perforation therein. The next two lower baffles have solid walls and are spaced from and below the first perforated baffle. The baffles form three separate compartments in the measuring and dispensing device. The cylindrical wall includes an exit opening into the compartments. The cylindrical wall is connected in and to a container and supported for longitudinal reciprocating movement into and partially out of the container as well as for rotational movement about the main longitudinal axis.

4 Claims, 4 Drawing Figures

PATENTED JUN 17 1975  3,889,654

MEASURING AND DISPENSING DEVICE

BACKGROUND OF THE INVENTION

This invention relates to an extendable rotatable actuated multi-purpose measuring and dispensing device, and, more particularly to, a dispenser for dispensing or sprinkling particularly measured quantities of material or pouring unmeasured quantities of material from a container through a single measuring and dispensing means.

In the past separate dispensing means have been designed for pouring a metered quantity of powdered material out of the container, for pouring unmeasured quantities of material out of the container, and for sprinkling a metered quantity of material from the container. Many of the prior art devices are designed for a single purpose use such as shown in the Dyer U.S. Pat. No. 1,502,298 and the Millard U.S. Pat. No. 3,197,091.

BRIEF DESCRIPTION OF THE INVENTION

The present invention relates to a new and improved measuring and dispensing device that may be utilized for sprinkling a measured quantity of material from a container, for pouring a measured quantity of material from the container and for pouring an unmeasured quantity of material from the container. The measuring and dispensing device is connected in and to the container for both rotational movement about the longitudinal axis as well as reciprocating movement into and partially out of the container to a projecting position. The measuring and dispensing device has a cylindrical body having an opening at the lower end and a hinged cap at the upper or top end. A first baffle having at least one opening therethrough is connected across the top of the cylindrical body just below the cap. A second baffle having an unbroken surface is connected to the cylindrical body. The second baffle is spaced from and below the first baffle forming and enclosing a first compartment and forming a second lower compartment. A third baffle may be connected to the cylindrical body. The third baffle is spaced from and below the second baffle to enclose the second compartment, and forming a third compartment below the second compartment. The measuring and dispensing device has pour openings in the cylindrical body into each compartment. The measuring and pouring device is positioned adjacent a longitudinal corner of the container walls in order to fill the compartments by rotating the cylindrical body. The cylindrical body is moved outwardly into a particular extended position in order to pour material from the compartments.

It is an object of this invention to provide a quick acting sprinkling-pouring, quantity regulating dispensing means.

It is another object of this invention to provide a non-complex measuring and dispensing means.

It is a further object of this invention to provide a measuring dispenser for containers that is easily adaptable to a non-measuring position.

An additional object of this invention is to provide a flexible and adaptable measuring and dispensing means that can be utilized for pouring or measuring fluids, powders, or granulated substances.

In accordance with these and other objects which will be apparent hereinafter, the instant invention will now be described with particular reference to the accompanying drawings.

DESCRIPTION OF A PREFERRED EMBODIMENT

Figure 3:
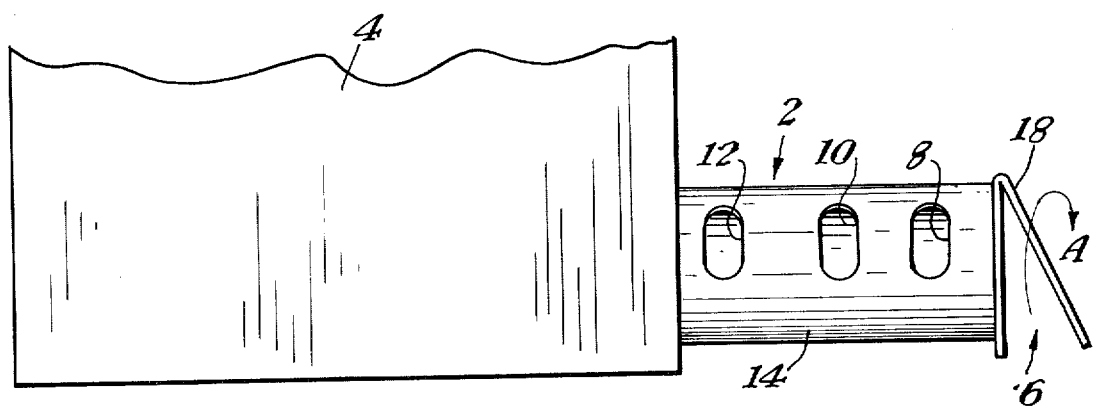
FIG. 3 is a side view of the measuring and dispensing device with the cap opened and illustrating the cylindrical body in a fully extended unmeasured pouring position.
Figure 2:
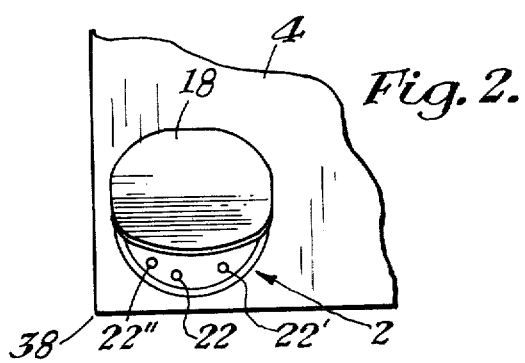
FIG. 2 is a top view of the measuring and dispensing device with a cut-away portion of the container shown.
Figure 4:
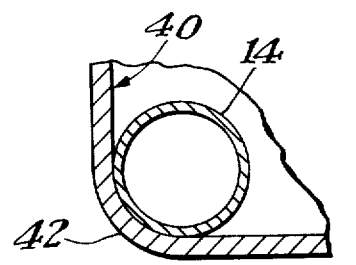
FIG. 4 is a top view in cross section of the cylindrical body in a container with a circular corner.

Referring now to the drawing, the measuring and dispensing device generally designed by number 2 is capable of sprinkling a measured quantity of material from the container 4 from hinged capped opening 6, especially when the box is shaped as shown in FIG. 4. The dispensing device may be used to pour a measured quantity of material from the container through openings 8 and 10, and may be used to pour an unmeasured quantity of material from the container through opening 12. The measuring and dispensing device 2 is connected in and to the container 4 for rotational movement, as shown by arrow A, about the longitudinal axis of the cylindrical container body 14, as well as, reciprocating movement into and partially from the container 2 to a projecting position as shown in FIG. 3.

The measuring and dispensing device 2 has a cylindrical body 14 having an opened lower end 16 and a hinged cap 18 at the top of the cylindrical body 14. A first baffle 20, with a plurality of openings such as those shown at 22, 22' and 22" therein is connected across the cylindrical body 14 just below the cap 18. A second solid baffle 24 is spaced from and below the first baffle 20 forming the first compartment 26. Baffle 24 is connected to the cylindrical body 14. A third baffle 30 is connected to cylindrical body 14 and spaced from and below the second baffle 24 to form and enclose the second compartment 28 and to form the third compartment 32. The third compartment 32 is located below the second compartment 28 and the third baffle. The cylindrical body has stop ring 34 connected thereto to prevent complete removal of the cylindrical body 14 from the container 4. Between the container 4 and the measuring and dispensing device 2, a support ring 36 may be included.

Figure 1:
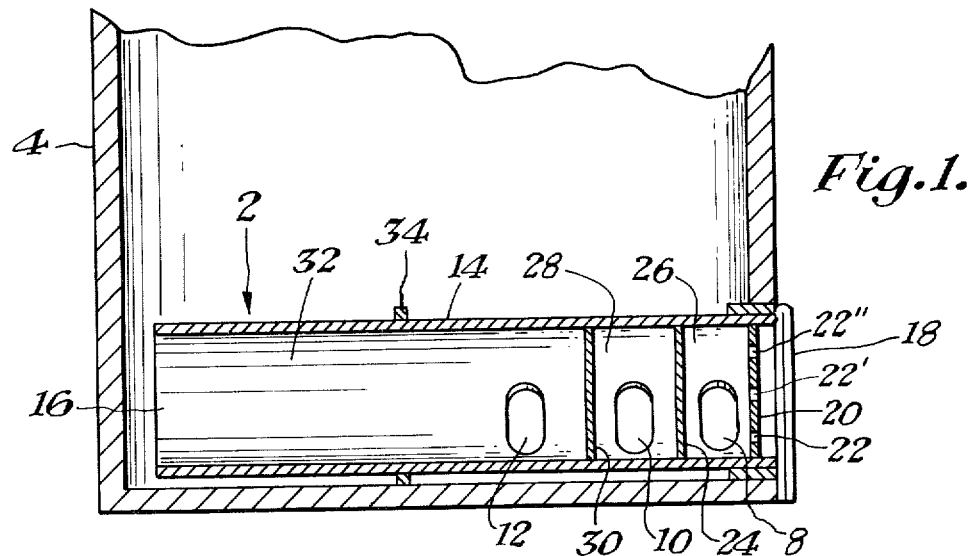
FIG. 1 is a side view in cross-section of the measuring and dispensing device with a cut-away portion of the container shown.

In FIG. 4, the corner 42 of the second illustrated box 40 is circular. This allows the opening 8, 10 and 12 to be open into the container or closed to the container when the cylindrical body 14 is in a normal position as shown in FIG. 1.

In use the measuring and dispensing device 2 is positioned adjacent a longitudinal corner 38 of the container walls in order to rotate and fill the compartments when the container is nearly empty. With the dispensing device in the box 4, the hinged cap 18 may be raised after the opening 8 is placed in a position facing away from the corner 38. The contents of the box or container 4 may be moved into compartment 26 in order to sprinkle a part or the entire contents of the box 4 out through the first baffle 20.

In a second method of use, first the hinged cap 18 is closed; the compartment 26 is then filled. Then the cylindrical body 14 is moved out of the box 4 until opening 8 is positioned out of the box. Thereafter the measured contents of compartment 8 is dispensed.

In a third method of use, cylindrical body 14 and the box or container 4 may be moved into a particular position to empty all compartments, thereafter by rotating the cylindrical body 14 to position the openings 8, 10 and 12 facing the container wall and then by moving the dispensing device partially out of the box 4 until opening 8 is removed from the container, the cylindrical body 14 is rotated and the box is positioned to fill compartment 28. Thereafter the cylindrical body 14 may be again moved out of the box to expose opening 10 in order to dispense the measured quantity of material in compartment 28.

It should be noted that a measured quantity of material may be dispensed from compartments 26 and 28 at the same time by first filling both compartments and thereafter dispensing the contents of both compartments.

All the material may be poured out of the box by moving the cylindrical body 14 out of the box exposing compartments 26 and 28 and opening 12. The material in the box will flow through opening 16 and out through opening 12.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A measuring and dispensing device connected to a container for sprinkling a quantity of material from a container, for pouring a measured quantity of material from the container, and for pouring an unmeasured quantity of material from the container comprising:
    a generally cylindrical body rotatably connectable to the container for reciprocal movement into and from the container along a longitudinal axis, said cylindrical body having an open lower end and including,
    a first baffle connected across the upper end of said cylindrical body,
    a second baffle connected across said cylindrical body spaced from and below said first baffle to enclose and form a first compartment, said second baffle forming a second compartment below said first compartment, and
    said cylindrical body including perimeter portions about an opening into the first and second compartments for filling and dispensing material in the container.

2. A measuring and dispensing device connected to a container as set forth in claim 1 wherein,
    said first baffle is perforated to sprinkle material out of the device.

3. A measuring and dispensing device connected to a container as set forth in claim 2, including a hinged cap closure connected to said baffle.

4. A measuring and dispensing device connected to a container as set forth in claim 3 including,
    a third baffle connected across said cylindrical body spaced from and below said second baffle enclosing said second compartment, and forming a third compartment below said first compartment.

* * * * *